2 Sheets—Sheet 1.

J. CAIN,

Assignor, by mesne assignments, to STEARNS MANUFACTURING CO.

Head-Blocks for Saw-Mills.

No. 9,074. Reissued Feb. 17, 1880.

WITNESSES

C. F. Dean.

Geo. Chuefant.

INVENTOR

John Cain

PER Jno K Halbock

ATTY

THE NORRIS PETERS CO., WASHINGTON, D. C.

2 Sheets—Sheet 2.

J. CAIN,

Assignor, by mesne assignments, to STEARNS MANUFACTURING CO.

Head-Blocks for Saw-Mills.

No. 9,074. Reissued Feb. 17, 1880.

WITNESSES

Cyrus P. Dean.

Scott Chaffant

INVENTOR

John Cain

PER Jno K Hallock

ATTY

THE NORRIS PETERS CO., WASHINGTON, D. C.

UNITED STATES PATENT OFFICE.

JOHN CAIN, OF PITTSBURG, ASSIGNOR, BY MESNE ASSIGNMENTS, TO STEARNS MANUFACTURING COMPANY, OF ERIE, PENNSYLVANIA.

HEAD-BLOCK FOR SAW-MILLS.

SPECIFICATION forming part of Reissued Letters Patent No. 9,074, dated February 17, 1880.

Original No. 131,051, dated September 3, 1872. Reissue No. 8,162, dated April 9, 1878. Application for Reissue filed January 20, 1880.

*To all whom it may concern:*

Be it known that I, JOHN CAIN, of Pittsburg, in the county of Allegheny and State of Pennsylvania, have invented certain new and useful Improvements in Saw-Mills; and I do hereby declare that the following is a full, clear, and exact description of the invention, that will enable others skilled in the art to which it appertains to make and use the same, reference being had to the accompanying drawings, and to the letters of reference marked thereon, which form a part of this specification.

Figure 1:
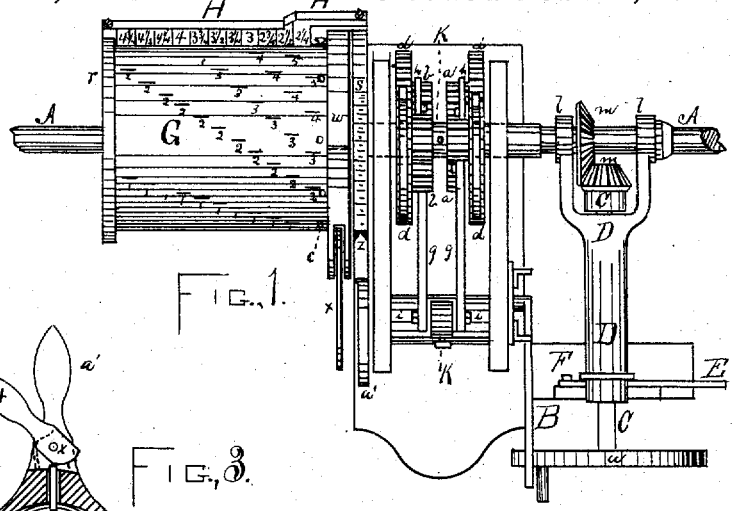
Figure 3:
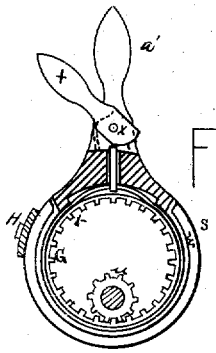
Figure 4:
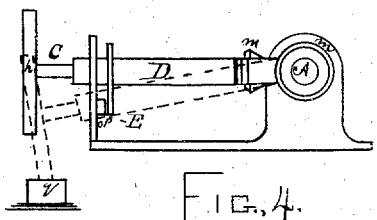
Figure 2:
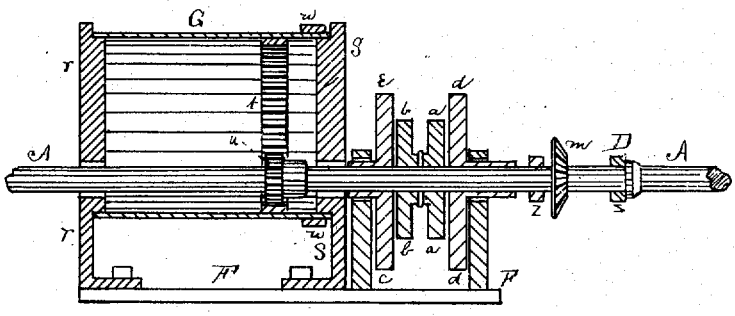
Figure 5:
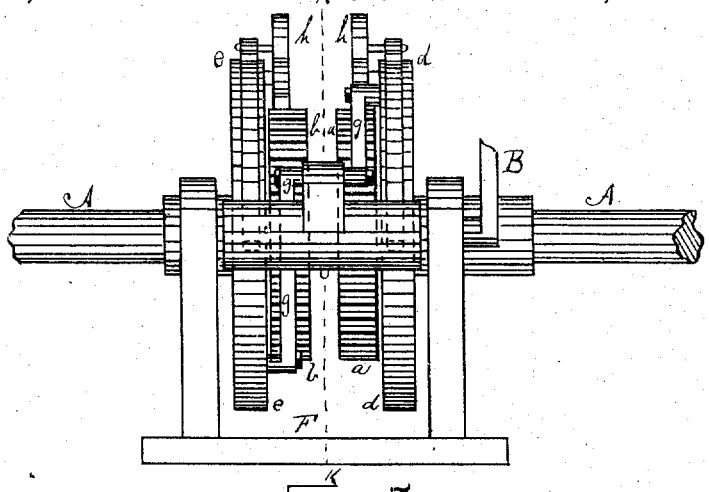
Figure 6:
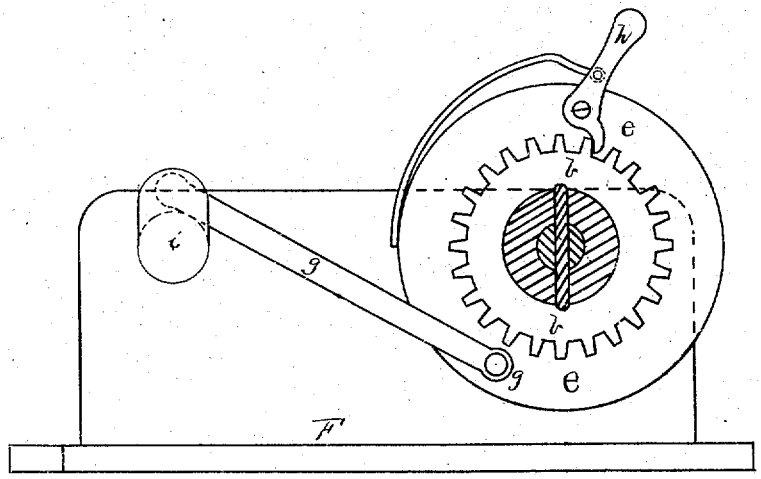

In the accompanying drawings, Figure 1 is a top view of my improved apparatus. Fig. 2 is a longitudinal vertical section of the same. Fig. 3 is a transverse vertical section on the line *c c*, Fig. 1. Fig. 4 is a side elevation of the parts marked D C, &c., on the right of Fig. 1. Fig. 5 is a direct front elevation of the central part of Fig. 1; and Fig. 6 is a transverse vertical section on the line *k k*, (seen in Figs. 1 and 5.) Figs. 5 and 6 are drawn on a larger scale than the other figures.

Similar letters mark similar parts in all the figures.

My invention relates to the construction and application of the setting mechanism of a saw-mill head-block; and it relates particularly to that class of head-blocks in which there is a main setting-shaft running transverse the knees, and from which they receive their motion.

As my invention in no way relates to the construction or operation of the knees they are not represented in the drawings, the parts shown being a fragment of the main setting or knee-actuating shaft A and the means I employ to operate said shaft, both for feeding or receding the knees.

My invention consists, first, in the means devised for rotating the shaft A for feeding the log to the saw, and their combination and arrangement with other parts, as hereinafter to be set forth; second, in the means devised for revolving said shaft A for receding the knees for the reception of a new log, and their combination and arrangement with other parts, as hereinafter to be set forth, and therefore, first, of the mechanism for rotating the shaft for advancing the knees, and its relation to the other parts of the head-block.

In the drawings this mechanism is shown in Figs. 1, 2, 5, and 6.

Attached to the shaft A is a ratchet-wheel, *a b*. This is in appearance two ratchet-wheels, but in effect it is the same as one; and as the two I show join in the hub on the shaft, it is the same as one wheel; and whether one or two wheels are, in fact, used makes no difference, for the shaft A is a continuous solid shaft, and if two separate wheels were keyed to it they would move together as one wheel. On each side of this ratchet *a b* are disks *e d*, which are loosely collared onto the shaft A, and are concentric with said shaft and with the ratchet *a b*, and being so loosely collared to the shaft they are free to move in either direction. Attached to each of these disks, on the side toward the ratchet, which is between them, are pawls *h h*, which engage with the ratchet *a b*; so it will be seen that the disks *e d* are simply carriers for the pawls *h h*. These disks or carriers are operated by being connected with a rock-shaft, *i*, by connecting-rods *g g*.

The rock-shaft *i* extends from or forms a part of an actuating-lever, B, which is shown at one end of the shaft *i*; but it may connect with it at any point. The rock-shaft *i* is a crank-shaft, and the connecting-rods *g g* attach to the crank-extension, and extend therefrom to the disks or carriers; and as the rock-shaft is oscillated by vibrating the lever B the disks are oscillated, and such a connection is made that the disks oscillate in opposite directions, and hence the pawls are made to traverse the ratchet in a forward direction alternately—that is to say, each pawl is made to actuate the ratchet alternately with the other pawl; so it will be seen that each movement of the lever actuates the shaft through the medium of one or the other of the pawls. A single action can be had by dispensing with one of the pawls, carriers, and connection-rods.

I am aware that a counter or crank shaft operated by an oscillating lever has heretofore been used, (see patent of Thos. E. Chandler, No. 97,357, November 30, 1869;) but in that case the pawls are connected directly with the counter-shaft crank, and not sufficient traverse of the pawls on the ratchet can be obtained.

I am also aware that pawls connected with carriers which are concentric with the ratchet and shaft are not new, (see patent to Selden;) and I am also aware that double action in connection with such carriers is old, (see patent to W. S. Jenks, 1871;) but in all such cases the carrier is extended and used as the actuating-lever, no counter-shaft and connection-rods being used.

I am also aware that pawls have been attached to concentric carriers which have been operated by being connected by rods to an actuating mechanism removed to one side thereof, (see the patent to Joseph Hubbell, October 19, 1869;) but in that case no main shaft connecting all the knees is used, and also no counter crank-shaft, that device being for operating the knees by screw-shafts running longitudinally with the knees.

I therefore do not claim as my invention any of the above-described devices; but I believe I am the first to construct a head-block having transverse operating-knees operated from a main shaft, A, extending longitudinally through the carriage, and hence lying transverse the knees, and provided with a ratchet, with its pawls supported or carried so as to move concentrically, and are operated by having the concentric pawl-carriers connected with a counter-crank shaft which is operated by an oscillating lever.

The object of my construction will best be seen by comparing it with that of Chandler's, (Patent No. 97,357.)

When the pawls connect directly with the crank, as in Chandler's device, they can have only a slight traverse on the ratchet and maintain a firm gripe on the tooth against which they set; but when they are supported or carried by a device which is concentric with the ratchet, and are operated from a crank-shaft by means of connecting-bars, as I show them, they can have a traverse or throw of much greater length, and the pawls set as firmly and squarely in the teeth at one part of the traverse as at another. Such a result is very desirable where rapid and accurate setting is required.

The advantages of this construction are all shown in the patent to Hubbell, above referred to; and my invention consists in an improved construction, and also in adapting the same for use in the particular class of head-blocks above mentioned.

The second part of my invention consists in the means devised for receding the knees for the reception of a new log. When this occurs the pawls *h h* must be thrown out of gear, so that the shaft A may be revolved in the opposite direction. A shaft, C, hanging in a frame, D, that is hung at *l l* to the shaft A, is, by beveled gears *m m*, connected with said shaft A, as shown in Fig. 1. The shaft C carries a friction-wheel, *n*, at its outer end.

When the shaft A is used to feed the log, in manner above specified, the frame D, carrying the shaft C, is held horizontal or level by a lever, E, which is pivoted to a vertical post, *o*, of the saw-carriage frame F, and rests on a stop, *p*, as shown in Fig. 4; but when the pawls *h h* are thrown out of gear the lever E is swung clear of the stop *p*, and allows the frame D of the shaft C to drop into an inclined position, (shown by dotted line in Fig. 4,) when the friction-wheel rests upon a stationary track or rail, *q*.

When the carriage is moved back or gigged, the wheel *n*, rolling on the track *q*, will revolve the shaft C, and, by the wheels *m m*, will revolve the shaft A in a reverse direction from that in which it revolves when feeding the log, and thus draws back the knees.

What I claim as new is—

1. In a saw-mill head-block, the pawls, concentric carriers, ratchet, and main setting shaft A, extending transverse the knees, in combination with links or connecting-rods, crank-shaft, and actuating-lever, substantially as and for the purposes set forth.

2. In a saw-mill head-block which has a shaft, A, running transverse the knees, and from which they are operated, the combination, with said shaft, of a ratchet-wheel, pawls, and concentric pawl-carrying device upon said shaft, an actuating-lever pivoted counter to said shaft and operating at right angles to the same, and mechanism, substantially as shown, for connecting said pawl-carriers with said lever, for the purposes set forth.

3. In a saw-mill head-block, the log-setting apparatus composed of the knee-operating shaft A, ratchet-wheels *a b*, loose disks *d e*, rods *g g*, pawls *h h*, shaft *i*, and lever B, all arranged to operate substantially as herein shown.

4. The shaft C, hanging in the vibrating frame D, and carrying a friction-wheel, *n*, when arranged to gear into the shaft A, substantially as herein shown and described.

In testimony that I claim the foregoing I have hereunto set my hand this 29th day of December, 1879.

JOHN CAIN.

Witnesses:
JNO. K. HALLOCK,
R. H. WHITTLESEY.